United States Patent
Scudiere

(10) Patent No.: US 8,310,202 B2
(45) Date of Patent: Nov. 13, 2012

(54) OFF-RESONANCE FREQUENCY OPERATION FOR POWER TRANSFER IN A LOOSELY COUPLED AIR CORE TRANSFORMER

(75) Inventor: Matthew B. Scudiere, Oak Ridge, TN (US)

(73) Assignee: UT-Battelle, LLC, Oak Ridge, TN (US)

( * ) Notice: Subject to any disclaimer, the term of this patent is extended or adjusted under 35 U.S.C. 154(b) by 330 days.

(21) Appl. No.: 12/858,070

(22) Filed: Aug. 17, 2010

(65) Prior Publication Data
US 2012/0043930 A1 Feb. 23, 2012

(51) Int. Cl.
*H02J 7/00* (2006.01)
*H02K 7/14* (2006.01)
*H01F 30/12* (2006.01)

(52) U.S. Cl. ........ 320/108; 320/109; 320/115; 320/139; 320/140; 320/141; 310/50; 336/DIG. 2

(58) Field of Classification Search .................. 320/108
See application file for complete search history.

(56) References Cited

U.S. PATENT DOCUMENTS

| | | | | |
|---|---|---|---|---|
| 4,654,573 | A * | 3/1987 | Rough et al. | 320/108 |
| 5,434,493 | A * | 7/1995 | Woody et al. | 320/108 |
| 5,889,384 | A * | 3/1999 | Hayes et al. | 320/108 |
| 6,418,038 | B2 | 7/2002 | Takahama et al. | |
| 6,934,165 | B2 | 8/2005 | Adler et al. | |
| 6,934,167 | B2 | 8/2005 | Jang et al. | |
| 7,211,986 | B1 * | 5/2007 | Flowerdew | 320/108 |
| 2002/0089305 | A1 * | 7/2002 | Park et al. | 320/108 |
| 2007/0279002 | A1 * | 12/2007 | Partovi | 320/115 |
| 2008/0062600 | A1 * | 3/2008 | Crawley et al. | 361/56 |
| 2008/0303479 | A1 * | 12/2008 | Park et al. | 320/108 |
| 2009/0096413 | A1 * | 4/2009 | Partovi et al. | 320/108 |
| 2009/0303753 | A1 | 12/2009 | Fu et al. | |
| 2009/0322307 | A1 | 12/2009 | Ide | |
| 2010/0164458 | A1 * | 7/2010 | Pollard | 323/284 |

FOREIGN PATENT DOCUMENTS
WO 94/28560 12/1997
(Continued)

OTHER PUBLICATIONS

Kutkut, N.H. et al., "Design Considerations and Topology Selection for a 120-kW IGBT Converter for EVFast Charging" IEEE Transactions on Power Electronics (Jan. 1, 1998) pp. 169-178, vol. 13, No. 1.

(Continued)

*Primary Examiner* — Yalkew Fantu
(74) *Attorney, Agent, or Firm* — Scully, Scott, Murphy & Presser, P.C.

(57) ABSTRACT

A power transmission system includes a loosely coupled air core transformer having a resonance frequency determined by a product of inductance and capacitance of a primary circuit including a primary coil. A secondary circuit is configured to have a substantially same product of inductance and capacitance. A back EMF generating device (e.g., a battery), which generates a back EMF with power transfer, is attached to the secondary circuit. Once the load power of the back EMF generating device exceeds a certain threshold level, which depends on the system parameters, the power transfer can be achieved at higher transfer efficiency if performed at an operating frequency less than the resonance frequency, which can be from 50% to 95% of the resonance frequency.

36 Claims, 12 Drawing Sheets

FOREIGN PATENT DOCUMENTS

| WO | 00/54387 | 9/2000 |
|---|---|---|
| WO | 2010/039046 A2 | 4/2010 |

OTHER PUBLICATIONS

Schmidt-Walter, H., "Dimensionierung von ZCS-Gegentakt-Resonanzwandlern" Elektronik (Jan. 20, 1998) pp. 104-104, Vol. 47, No. 2.

Ivensky, G. et al., "Reducing IGBT Losses in ZCS Series Resonant Converters" IEEE Transactions on Industrial Electronics (Feb. 1, 1999) pp. 67-74, vol. 46, No. 1.

International Search Report dated Jan. 26, 2012, issued in corresponding International Application No. PCT/US2011/047830.

Imura, T. et al., "Study on Open and Short End Helical Antennas with Capacitor in Series of Wireless Power Transfer using Magnetic Resonant Couplings" *IEEE* (2009) pp. 3848-3853.

Bendre, A., "Dynamic Analysis of Loss-limited Switching Full-Bridge DC-DC Converter with Multimodal Control" *IEEE Transactions on Industry Applications* (2003) pp. 854-863, vol. 39(3).

Hayes, J.G. et al., "Wide-Load-Range Resonant Converter Supplying the SAE J-1773 Electric Vehicle Inductive Charging Interface" *IEEE Transactions on Industry Applications* (1999) pp. 884-895, vol. 35(4).

\* cited by examiner

OFF-RESONANCE FREQUENCY OPERATION FOR POWER TRANSFER IN A LOOSELY COUPLED AIR CORE TRANSFORMER

STATEMENT REGARDING FEDERALLY SPONSORED RESEARCH OR DEVELOPMENT

This invention was made with United States government support under Prime Contract No. DE-AC05-00OR22725 awarded by the U.S. Department of Energy. The United States government has certain rights in this invention.

FIELD OF THE INVENTION

The present invention relates to the field of inductive power transmission, and particularly to apparatus and methods for transmitting power in a loosely coupled air core transformer at an off-resonance operational frequency to achieve higher transfer efficiency than the transfer efficiency at resonance frequency.

BACKGROUND OF THE INVENTION

A transformer transfers electrical energy from one circuit to another through inductively coupled conductors, which are the coils. A change in current in a primary coil of a first circuit generates a time-dependent magnetic flux through a secondary coil in a second circuit. One of Maxwell's four equations provides:

$$\nabla \times E = -\frac{\partial B}{\partial t},$$

which can be rewritten in an integral form as:

$$\oint_{\partial S} E \cdot dl = -\frac{\partial \Phi_{B,S}}{\partial t}.$$

Thus, the time-dependent magnetic flux through the secondary coil induces an electromotive force (EMF) or in the secondary coil.

In many transformers, a ferromagnetic core is employed to guide the magnetic flux more effectively between the primary coil and the secondary coil. The ferromagnetic core is made of iron, cobalt, nickel, and/or other ferromagnetic materials, most of which have a density of at least 7.8 g/cm$^3$. Thus, transformers with a ferromagnetic core tend to be heavy, in addition to being costly to manufacture.

An air core transformer is a transformer that does not have a ferromagnetic core. As the name suggests, the primary coil and the secondary coil are separated by air. While air core transformers tend to have a coupling coefficient k that deviates significantly from 1.0, air core transformers are significantly lighter and cheaper to manufacture than ferromagnetic core transformers having a comparable inductive coupling, as well as not as critically being dependent on alignment between the primary coil and the secondary coil. The coupling coefficient k refers to the ratio of the magnetic flux that cuts through both the secondary coil and the primary coil to the total magnetic flux that cuts through the primary coil. A transformer is "tightly coupled" if the coupling coefficient k is greater than 0.5, and is "loosely coupled" if the coupling constant k is equal to or less than 0.5.

Most air core transformers are loosely coupled transformers except for specially designed variants in which the secondary coil and the primary coil are designed to be located in close proximity with precise alignment. In loosely coupled air core transformers, the non-critical dependence of the performance of an air core transformed on the alignment between the primary coil and the secondary coil enables physical separation of an air core transformer into two movable parts. In other words, a first structural part including a primary coil can be physically displaced from a second structural part including a secondary coil, and subsequently put together without requiring a precise alignment therebetween for power transfer.

The potential to displace and reposition the secondary coil relative to the primary coil in a loosely coupled air core transformer can be exploited to inductively transfer power from a power outlet to an electrical vehicle. Methods of transferring power through inductive coupling are shown, for example, in U.S. Pat. No. 6,934,167 to Jang et al., U.S. Pat. No. 6,934,165 to Adler et al., and U.S. Pat. No. 6,418,038 to Takahama et al and in U.S. Patent Application Publication Nos. 2009/0322307 to Ide and 2009/0303753 to Fu et al. Prior art methods transfer power at a resonance frequency $f_0$ of an air core transformer, which is given by:

$$f_0 = \frac{1}{2\pi\sqrt{LC}},$$

in which L is the inductance of the circuit including the primary coil and C is the capacitance of the circuit including the primary coil. The resistance of the circuit including the primary coil is not considered in determining the resonance frequency $f_0$, although the resistance of the circuit including the primary coil affects the Q-factor of the resonance. The circuit parameters of the secondary circuit including the secondary coil are selected to induce resonance at the resonance frequency $f_0$, i.e., such that the product of the inductance and the capacitance of the secondary circuit matches the product of the inductance and the capacitance of the primary circuit.

SUMMARY OF THE INVENTION

A power transmission system includes a loosely coupled air core transformer having a resonance frequency determined by a product of inductance and capacitance of a primary circuit including a primary coil. A secondary circuit is configured to have a substantially same product of inductance and capacitance. A back EMF generating device (e.g., a battery), which generates a back EMF with power transfer, is attached to the secondary circuit. Once the load power of the back EMF generating device exceeds a certain threshold level, which depends on the system parameters, the power transfer can be achieved at higher transfer efficiency if performed at an operating frequency less than the resonance frequency, which can be from 50% to 95% of the resonance frequency and depends upon actual values of components used.

To date, most investigations on inductive power transfer through transformers have focused on getting the highest power level of load power, which occurs at resonance, and then optimizing the transfer efficiency at that resonant point. Investigations leading to the present disclosure have shown, however, that the highest transfer efficiency does not occur at a resonant frequency of a transformer. Thus, it is possible to achieve the highest efficiency in a transformer first and subsequently determining additional parameters needed to achieve the desired level of output power. Specifically, near maximum transfer efficiency is achieved by operating a transformer below the resonant frequency. An inductively coupled power transfer system can be configured so that the alternating current power source provides alternating voltage at an operating frequency in a range from 50% to 95% of the resonant frequency. Because the operating frequency is significantly offset from the resonance frequency, other receiving components in the secondary circuit located in the vicinity of the load couple less with the primary circuit, and therefore draws less power from the primary circuit. By deliberately avoiding maximum load power achievable at resonance, it is possible to provide an inductively coupled power transfer system with enhanced transfer efficiency.

According to an aspect of the present disclosure, an apparatus for inductively transmitting power to a back EMF generating device is provided. The apparatus includes: a loosely coupled air core transformer including a primary coil in a primary circuit and a secondary coil in a secondary circuit, wherein the primary coil has a first resonance frequency determined by a product of a primary inductance and a primary capacitance in the primary circuit; an alternating current (AC) voltage supply that supplies alternating voltage at an operating frequency between 50% and 95% of the first resonance frequency; and a back EMF generating device electrically coupled to the secondary coil.

According to another aspect of the present disclosure, a method of inductively transmitting power to a back EMF generating device is provided. The method includes: providing a loosely coupled air core transformer including a primary coil in a primary circuit and a secondary coil in a secondary circuit, wherein the primary coil has a first resonance frequency determined by a product of a primary inductance and a primary capacitance in the primary circuit; and applying alternating voltage at an operating frequency between 50% and 95% of the first resonance frequency to the primary coil, wherein electrical power is transmitted to a back EMF generating device electrically coupled to the secondary coil through the loosely coupled air core transformer.

DETAILED DESCRIPTION OF THE INVENTION

Figure 1:
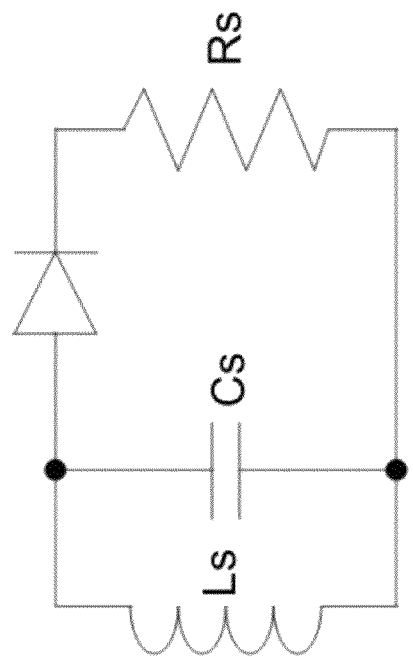
FIG. 1 is a schematic of a first exemplary air core transformer circuit according to the present disclosure.
Figure 1:
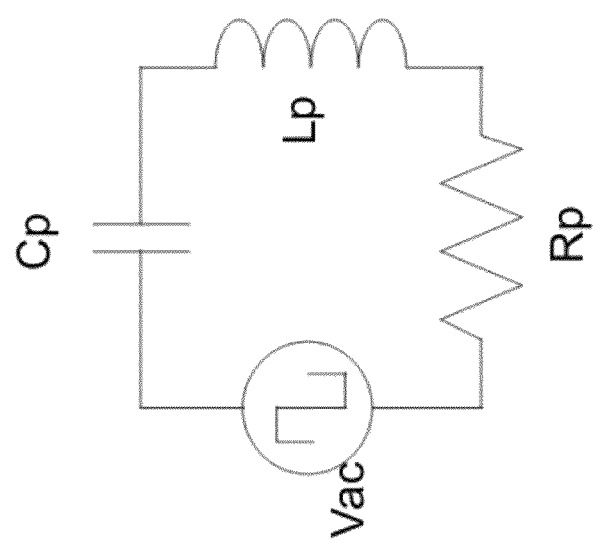

As stated above, the present invention relates to apparatus and methods for transmitting power in a loosely coupled air core transformer at an off-resonance operational frequency, which are now described in detail with accompanying figures. It is noted that like and corresponding elements mentioned herein and illustrated in the drawings are referred to by like reference numerals.

The circuit of the present disclosure is configured to select an operational frequency that is not a resonance frequency of a primary circuit of a loosely coupled air core transformer. In order to illustrate the operation of the circuit of the present disclosure, various exemplary circuits with a variable frequency power source are considered for their operational characteristics.

Referring to FIG. 1, a first exemplary air core transformer circuit includes a primary circuit located on the left side and a secondary circuit located on the right side. The series input impedance of the primary circuit is the series impedance of the primary inductance $L_p$, the primary capacitance $C_p$, and the primary resistance $R_p$. The series input impedance of the primary circuit is frequency dependent, and achieves a minimum absolute value at a first resonance frequency. For this reason, the primary circuit is a series resonant circuit. The parallel output impedance of the secondary circuit is the parallel impedance of the secondary impedance $L_s$, the secondary capacitance $C_s$, and the secondary resistance $R_s$. The parallel output impedance of the secondary circuit is also frequency dependent, and achieves a minimum absolute value at a second resonance frequency. For this reason, the primary circuit is a parallel resonant circuit. For the purposes of power transmission, the series input impedance is a voltage input impedance of the exemplary air core transformer circuit, and the parallel output impedance is a current output impedance the exemplary air core transformer circuit.

An alternating current (AC) voltage source is attached to the left side of the series L-R-C circuit to complete the primary circuit, which is the circuit on the left side. The AC voltage source connects to the primary circuit side of the power grid, and generates a magnetic field through a primary coil, which is the primary inductor (i.e., transmitting inductor) having the primary inductance $L_p$. The flux of the magnetic field is then received by a secondary coil, which is the secondary inductor (i.e., receiving inductor) having the secondary inductance $L_s$ by being in proximity to the primary inductor. A diode in the secondary circuit can cause the electrical current through a secondary resistor having the secondary resistance $R_s$ only in one direction. The voltage output impedance of an alternating voltage source Vac can be selected to match the series impedance of the primary inductance $L_p$, the primary capacitance $C_p$, and the primary resistance $R_p$ at an operational frequency, which is the first resonance frequency in prior art applications, but is different from the first resonance frequency according to the present disclosure.

In applications for charging hybrid-electric automobiles, the primary circuit can be fixed on a pavement, while the secondary circuit can be attached to the undercarriage of a vehicle. The only "connection" between the two circuits is provided by the magnetic fields that the primary inductor generates and the secondary inductor receives. For this reason, the primary inductor is a primary antenna that emits a magnetic flux, and the secondary inductor is a secondary antenna that captures the magnetic flux.

The main disadvantage of the primary circuit is that a resonant tank current oscillates through the AC voltage source Vac with a low power factor. This oscillation increases the need for a higher power rating for the AC voltage source Vac. However, with fewer components (and consequently, less resistance), the series resonant circuit of the primary circuit can be more efficient than a parallel-parallel circuit exemplified subsequently in FIG. 3. The parallel-parallel circuit will require an additional series L-C circuit in series with the parallel L-C primary to correct the low power factor. This will reduce the requirement for a larger power source at the cost of extra components and losses. For long term use it is expected that the extra cost of a larger power source will be less than the power losses during use. The method presented here applies to all combinations of series and parallel.

In terms of complexity in the analysis of power transfer, driving a resistive load in the form of the secondary resistor having the secondary resistance Rs is the simplest approach and is usually what is presented in the analysis of this type of circuit. But this analysis does not apply to circuits that include a device that generates back electromotive force (EMF), which is herein referred to as a "back EMF generating device." In other words, the analysis of the first air core transformer circuit with a pure resistive load is not applicable to the analysis of air core transformer circuits including a back EMF generating device to be presented below.

Figure 2:
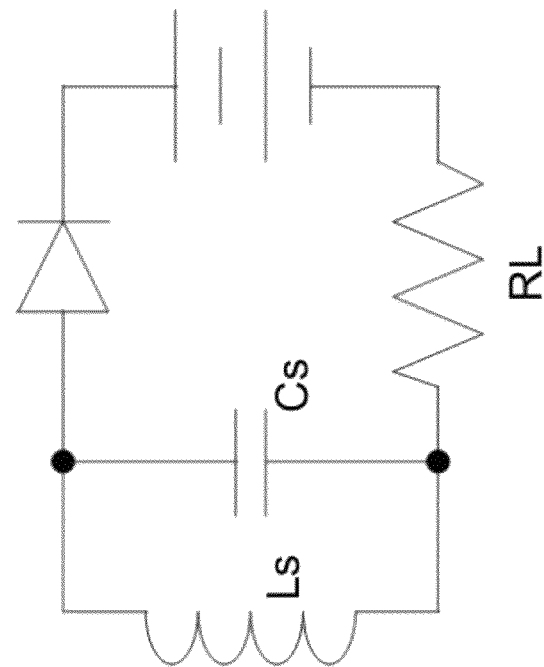
FIG. 2 is a schematic of a second exemplary air core transformer circuit according to the present disclosure.
Figure 2:
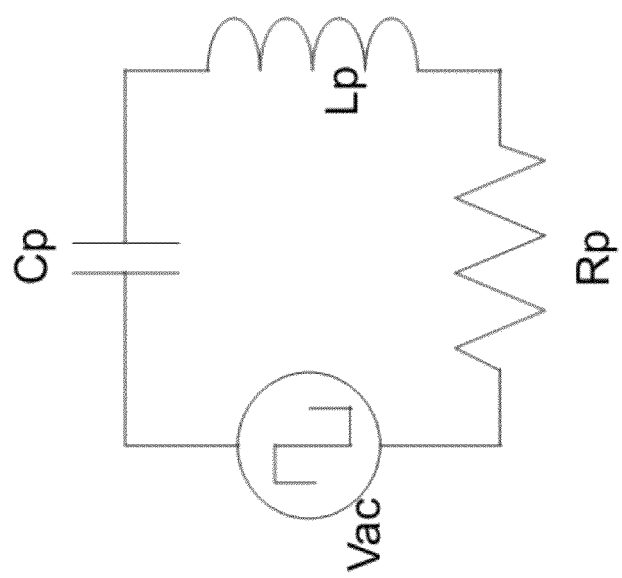

A typical back EMF generating device is a battery, which functions as a load that needs charging and applies a back EMF in proportion to the voltage that accumulates therein upon charging. Referring to FIG. 2, a second exemplary air core transformer circuit is derived from the first exemplary air core transformer circuit of FIG. 1 by replacing a simple resistive load with a combination load of a battery and a resistor which represents the internal resistance of the battery. In general, the battery can be replaced with any device that generates a back electromotive force (EMF) upon transfer of power thereto. The second exemplary air core transformer circuit more accurately represents an air core transformer circuit employed to charge a battery. While the transfer efficiency of the first exemplary air core transformer circuit increases with the increase in the resistive load, i.e., the secondary resistance Rs, the transfer efficiency of the second exemplary air core transformer circuit depends on the total load, which is the combination of the load resistance RL and the back EMF load. Specifically, the transfer efficiency of the second exemplary air core transformer circuit decreases with the increase in the load of the back EMF load, i.e., the load of the battery. The transfer efficiency is the ratio of the power delivered to a load on the secondary circuit to the power input to the primary circuit. The power transfer characteristics are dependent upon the frequency of the alternating voltage source as well as the characteristics of the combination load.

Figure 3:
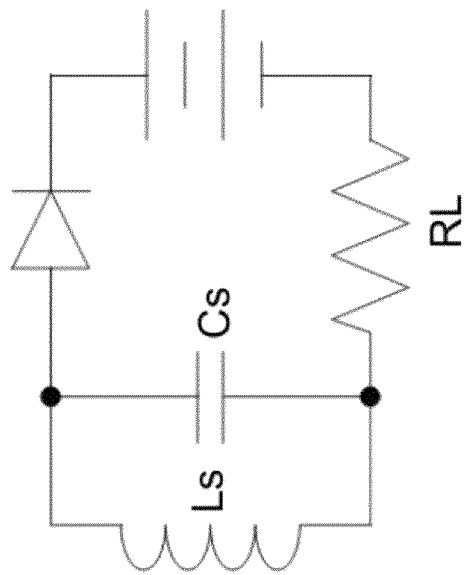
FIG. 3 is a schematic of a third exemplary air core transformer circuit according to the present disclosure.
Figure 3:
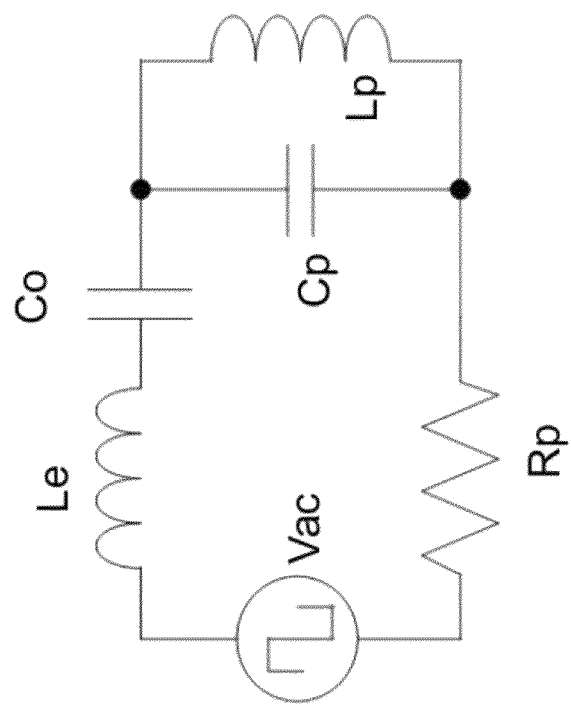

Referring to FIG. 3, a third exemplary air core transformer circuit is derived from the second exemplary air core transformer circuit of FIG. 2 by reconfiguring the primary inductor and the primary capacitor in a parallel connection that is in series with the primary resistor, and then adding an extra series inductor with an extra inductance Le in a series connection the primary resistor with an optional capacitor in series with the series inductor and the parallel-connected primary capacitor and primary inductor. Co represents the capacitance of the optional capacitor. The third exemplary air core transformer circuit can be utilized when a higher power factor is desired in the power source, which is the AC voltage source Vac. The higher power factor reduces the need for a larger Volt AMP (VA) rating of the AC voltage source Vac. The extra series inductor and optional capacitor provides the beneficial effect of increasing the power factor for greater efficiency in the power source, which is typically an inverter. However, the extra series components also add additional resistive losses, which can produce a lower overall system efficiency than the series-parallel circuit of FIG. 2. The power transfer characteristics are dependent upon the frequency of the alternating voltage source as well as the characteristics of the combination load.

Figure 4:
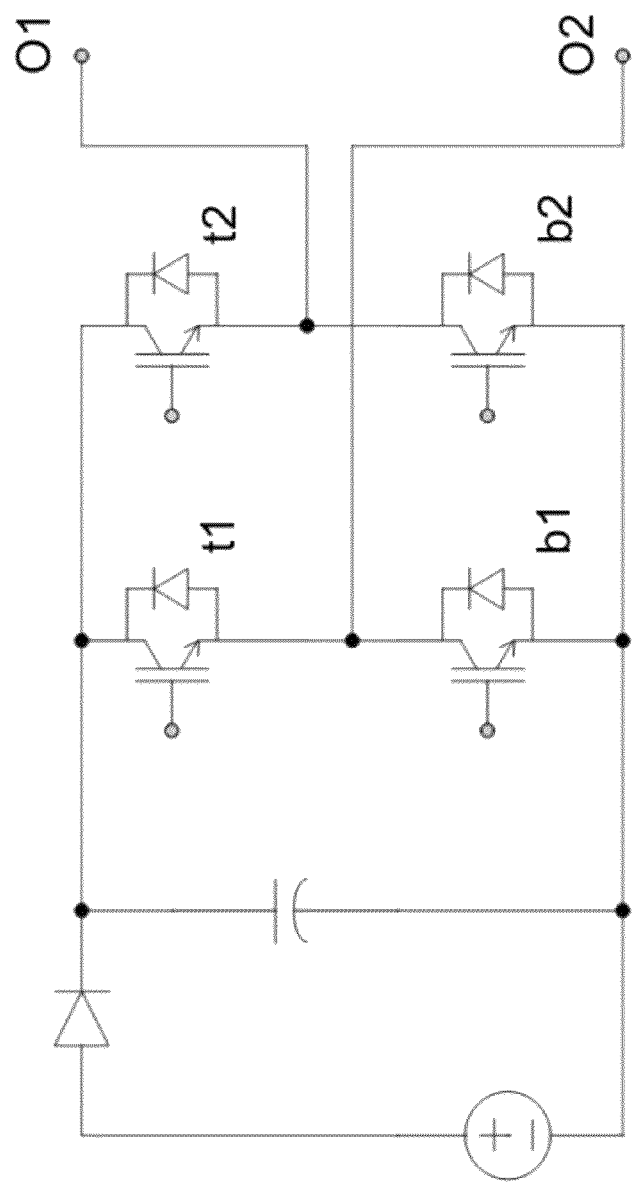
FIG. 4 illustrates an H-bridge circuit (shown on the right side) including of four insulated gate bipolar transistors (IGBT's) as an example of an AC voltage source Vac (shown on the left side).
Figure 4:
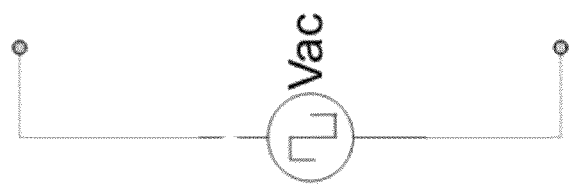

Referring to FIG. 4, the AC voltage source Vac (shown on the left side) can be an H-bridge circuit (shown on the right side) including of four insulated gate bipolar transistors (IGBT's), which switch on and off in alternate legs to convert a DC input voltage into an alternating square wave output, which feeds the L-R-C tank circuit. For example, the IGBT's labeled t1 and b2 can turn on simultaneously, while the IGBT's labeled t2 and b1 are turned off during a first portion of a cycle to cause electrical current to flow in one direction through a circuit (not shown) connected to the output nodes (O1, O2). During a second portion of the cycle, the IGBT's labeled t2 and b1 turn on simultaneously, while the IGBT's labeled t1 and b2 are turned off to cause electrical current to flow in the opposite direction through the circuit connected to the output nodes (O1, O2). The H-bridge thus generates a square wave at the frequency of the switching circuit controlling the four IGBT's. Other power sources or converters such as a flyback transformer can also be used instead. The power transfer characteristics are dependent upon the frequency of the alternating voltage source as well as the characteristics of the combination load.

Figure 5:
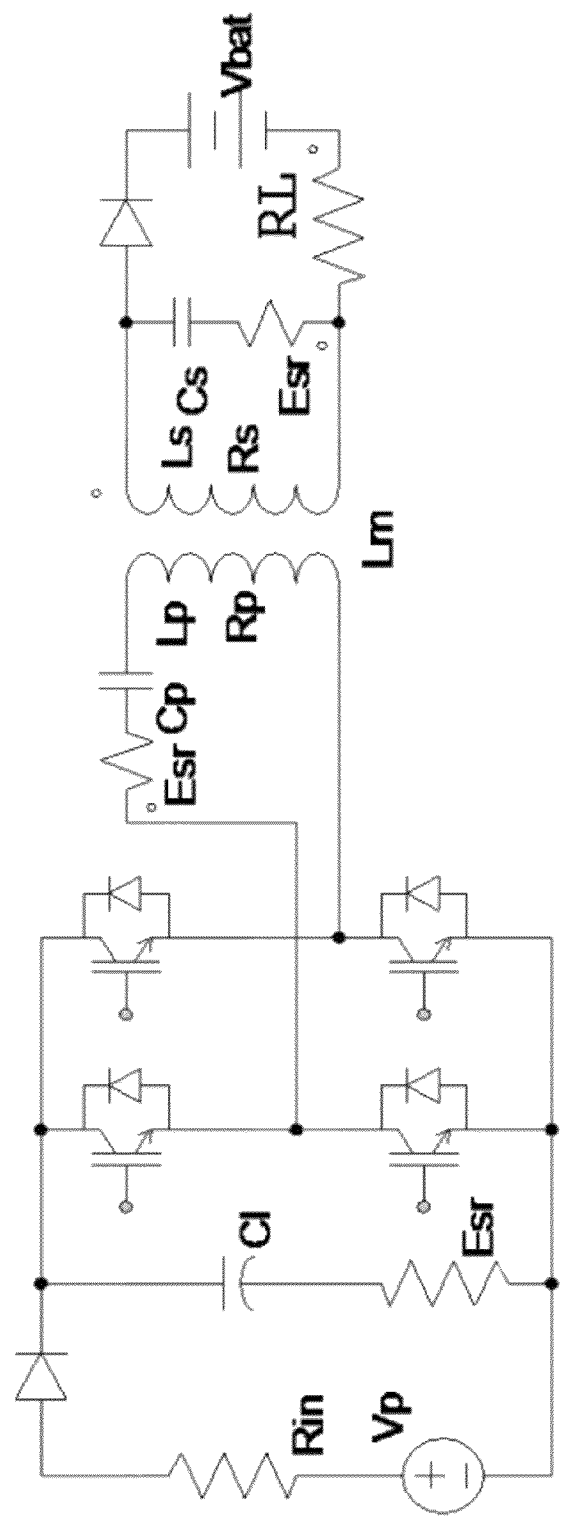
FIG. 5 is a schematic of a fourth exemplary air core transformer circuit according to the present disclosure.

Referring to FIG. 5, a fourth exemplary air core transformer circuit employs a modified third exemplary air core transformer circuit of FIG. 3 in combination with a variation of the H-bridge circuit of FIG. 4. Specifically, each ideal capacitor in FIG. 3 has been replaced with a capacitor and an equivalent series resistance (Esr) resistor which represents the internal resistance of the capacitor.

Figure 6A:
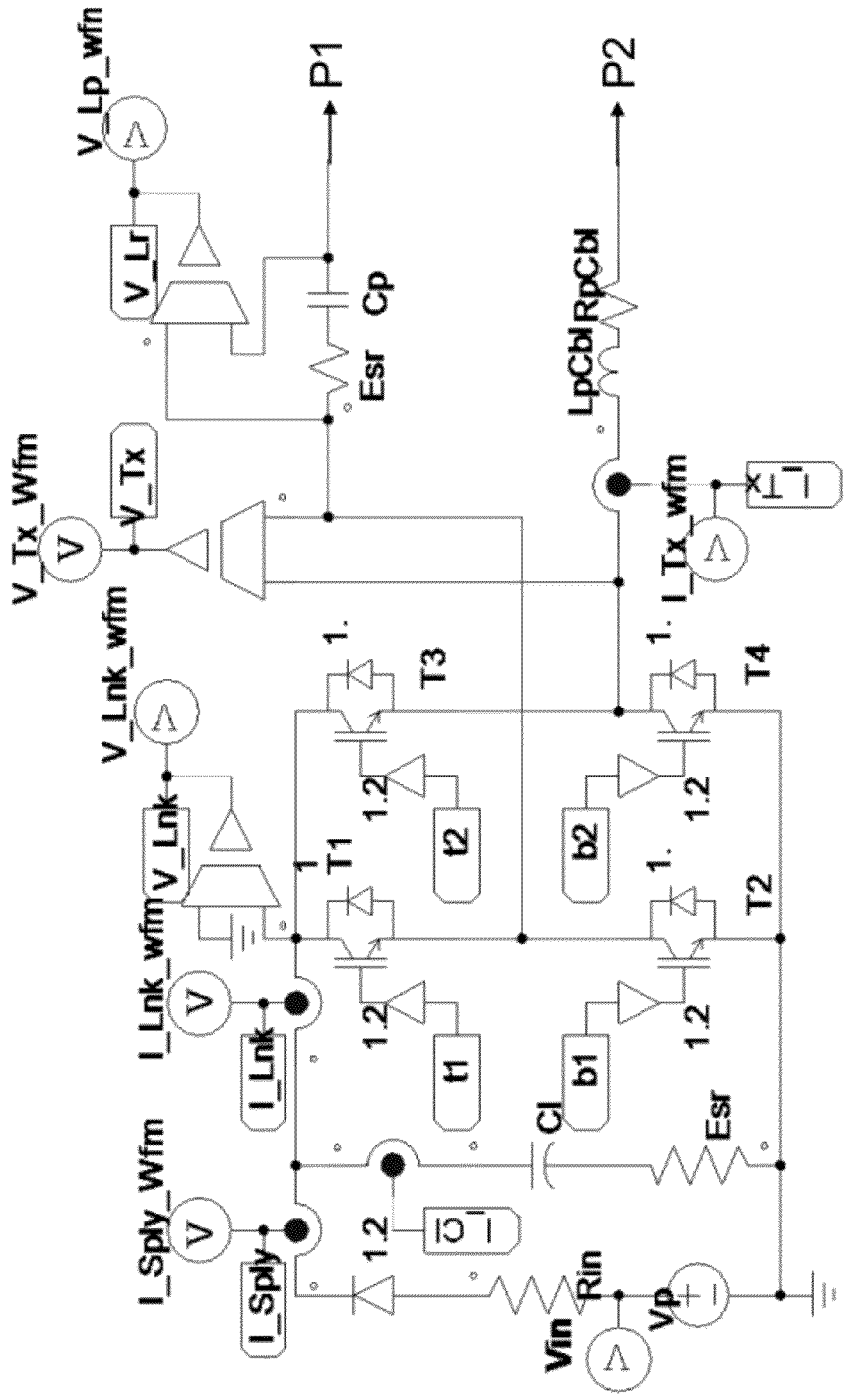
FIGS. 6A and 6B are a first part and a second part, respectively, of a schematic of a fifth exemplary air core transformer circuit according to the present disclosure.
Figure 6B:
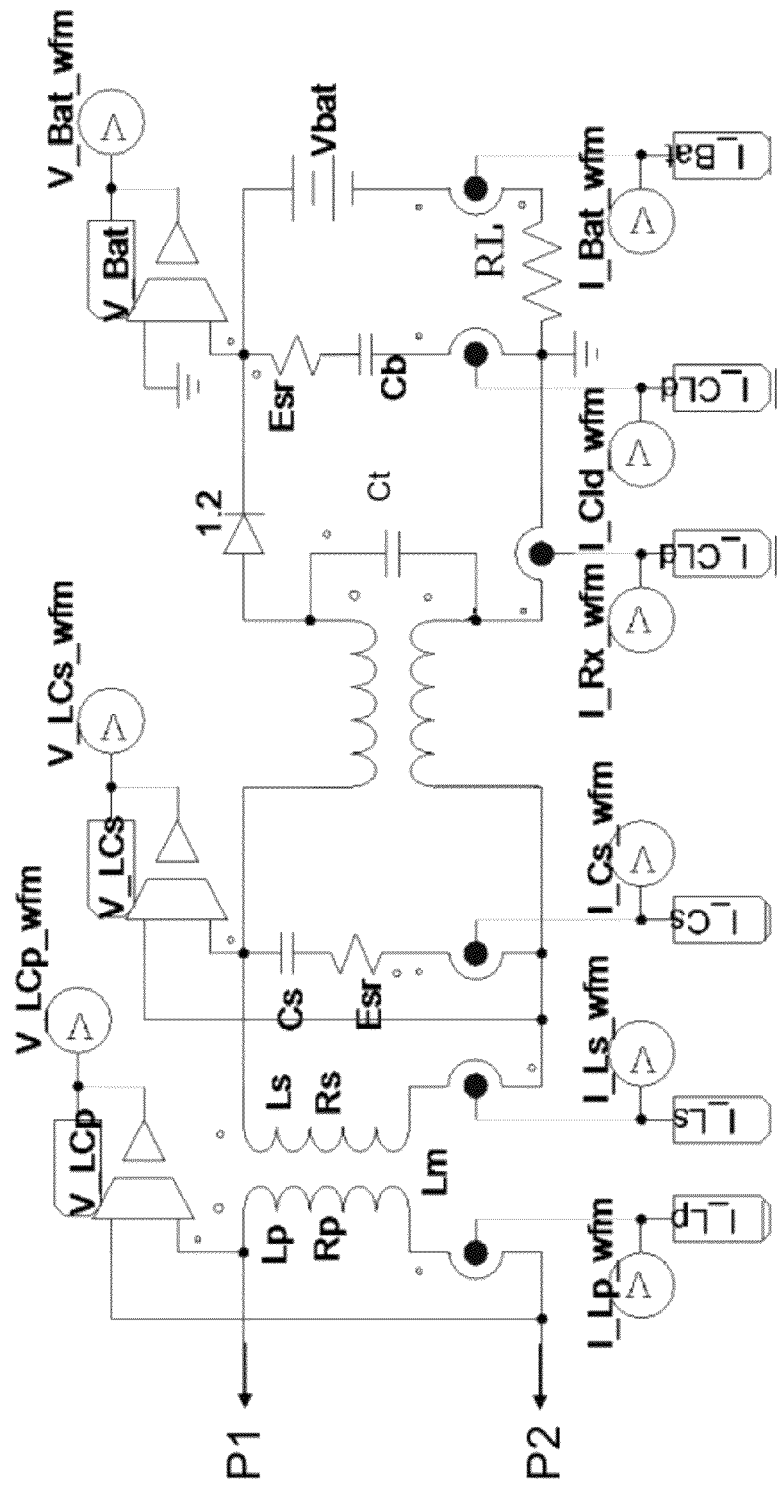

Referring to FIGS. 6A and 6B, a simulation schematic for a fifth exemplary air core transformer circuit is shown. The simulation schematic further includes additional components that simulate an experimental setup the Oak Ridge National Laboratory, which includes a long cable to allow movement between the antennas (the primary coil and the secondary coil). Specifically, the long cables are modeled by a second "transformer" which has all the same properties and which does introduce some variation to the final calculation. The second transformer was included to better match the computational model with the actual experimental setup. Other components such as capacitors and their corresponding equivalent series resistances (ESR's) are included for this same purpose. The simulation schematic also shows probes and cables connected to the probes as well to record values at every point in the simulated cycle. FIG. 6A shows the first part of the simulation schematic with two nodes P1 and P2. FIG. 6B shows the second part of the simulation schematic with the same two nodes P1 and P2, which are connected to the nodes P1 and P2 of FIG. 6A.

Standard circuit notations are used throughout FIGS. 6A and 6B. Nodes at which measurements are taken are shown in dark circles accompanied with notations characterizing the nature of the measurement (e.g., voltage measurement or current measurement) and the names of measurement parameters assigned thereto.

Simulations were performed according to the simulation schematic using the following values for the various components on a power simulator analysis software. In particular the program used was PSIM by Powersim inc. It is a simulation software package specifically designed for power electronics and motor control. The simulations herein also included parasitic and other extraneous impedances not shown in the simulation schematic, but are necessarily present in practice. Table 1 provides the descriptions and values as used in the simulations for labeled components in the simulation schematic.

TABLE 1

Descriptions and Values as used in simulations for labeled components in the simulation schematic of FIGS. 6A and 6B.

| Label | Value | Description |
| --- | --- | --- |
| Vp | 0-1 kV | DC power source |
| Rin | 10 MOhms | Output impedance of power supply |
| Cl | 10,000 µF | Link capacitor |
| Esr | 1 MOhm | Generic ESR of capacitors |
| Cp | 2.69 µF | Resonant primary capacitor |
| Lp | 15.05 µH | Inductance of primary inductor (Tx antenna) |
| Rp | 11.5 MOhms | Resistance of primary inductor at frequency |
| Ls | 17.2 µH | Inductance of secondary inductor (Rx antenna) |
| Rs | 18 MOhms | Resistance of secondary inductor at frequency |
| k | 0.3 | Coupling constant |
| Lm | $k \times \sqrt{Lp \times Ls}$ | Mutual inductance |
| Cs | 2.52 µF | Secondary resonant capacitor |
| Rpt | 13 MOhm | Tertiary inductor primary resistance (cable) |
| Rst | 19.3 MOhm | Tertiary inductor secondary resistance (cable) |
| Lpt | 3.68 uH | Tertiary inductor primary inductance (cable) |
| Lst | 3.47 µH | Tertiary inductor secondary that simulates movable cables |
| Ct | 0.01 µF | Tertiary capacitor that simulates movable cables |
| Vbat | 120 V | Battery voltage [back EMF] |
| RL | 5 mohm | Impedance of battery or load resistance |

Figure 7:
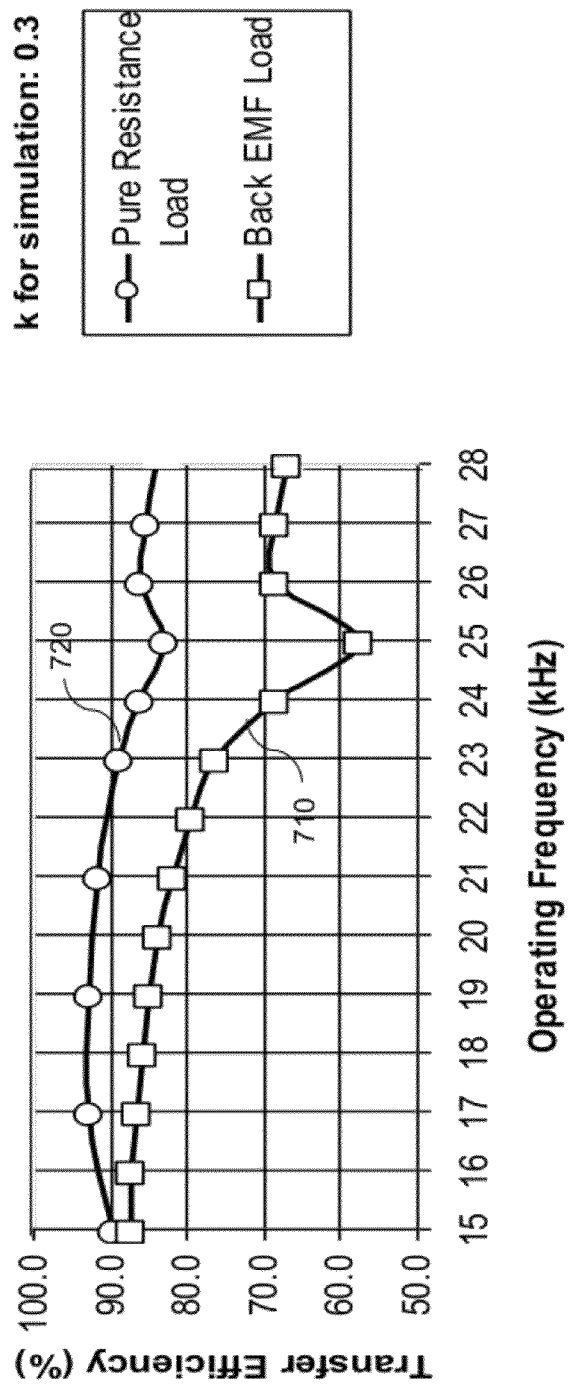
FIG. 7 is plot of transfer efficiency for the fifth exemplary air core transformer circuit and a sixth exemplary air core transformer circuit as generated by simulations.

Referring to FIG. 7, the transfer efficiency of the fifth exemplary air core transformer circuit is plotted as a function of operating frequency in a first curve 710 labeled "Back EMF load." The back EMF load can be a battery to charge. The operating frequency is the frequency of the AC voltage source Vac. In addition, the transfer efficiency of a sixth exemplary air core transformer circuit (not shown), which is derived from the fifth exemplary air core transformer circuit by substituting a pure resistance load, is shown in a second curve 720 labeled "Pure Resistance Load."

This plot in FIG. 7 demonstrates the advantage of operating the fifth exemplary air core transformer circuit at a lower frequency than the resonance frequency of the system, i.e., the first resonance frequency $f_0$ given by:

$$f_0 = \frac{1}{2\pi\sqrt{LpCp}}.$$

Note that the norm in industry is to operate transformer circuits at the resonance frequency.

Both the transmit tank circuit in the primary circuit and the receive tank circuit in the secondary circuit were tuned to 25 kHz resonance in this simulation. A representative point of a 10 kW load was selected for display. Comparison of the first curve 710 with the second curve 720 clearly shows that the transfer efficiency, which is defined as the power delivered into the battery or load resistor divided by the power into the transmitting L-C circuit. The efficiency of the power supply, which can be the inverter of FIG. 4 for example, is not considered in this calculation. In practice, the efficiency of the power supply can vary widely between manufacturers and belong to a different category of technology by itself.

The plot in FIG. 7 demonstrates that transfer efficiency for a loosely coupled air core transformer circuit including a pure resistance and coupling constant k=0.3, increases when operated below the resonance frequency of 25 kHz up to a certain frequency around 76% of the resonance frequency of the air core transformer circuit, i.e., a frequency around 19 kHz. Below 76% of the resonance frequency of the air core transformer circuit, the transfer efficiency of the loosely coupled air core transformer circuit decreases with a decrease in the operating frequency.

When back EMF generating device is employed the load, then the transfer efficiency drops considerably at the resonance frequency (25 kHz in FIG. 7) due to the extra EMF the system has to supply to overcome the back EMF before additional power transfer can take place. Lowering the operating frequency below the resonance frequency can the transfer efficiency from 58% to over 85% when operated below 76% of the resonance frequency of the air core transformer circuit, which is 19 kHz in FIG. 7.

In the specific case of the first and second curves (710, 720) in FIG. 7, the switch timing of the IGBT's used for the H-bridge power supply system was selected such that the output of the H-bridge power supply system was positive for 30% of the cycle (the period of the AC output voltage), 0 for the next 20% of the cycle, negative for the next 30% of the cycle, and 0 for the remaining 20% of the cycle. This switch timing provided a relatively large dead time for the IGBT's to recover. Shortening this duty cycle does not affect the efficiency, but does require a larger source voltage input for the H-bridge power supply with correspondingly smaller current capacity. In general, duty cycles can be used as a parameter to match the voltage and current requirements of a power supply. Simulation results for other combinations of series and parallel arrangements of inductors, capacitors, and resistors in the primary and the secondary circuits as illustrated in FIGS. 1, 2 and 3 show the same characteristics as far as the functional dependence of the transfer efficiency on the operating frequency is concerned.

Figure 8A:
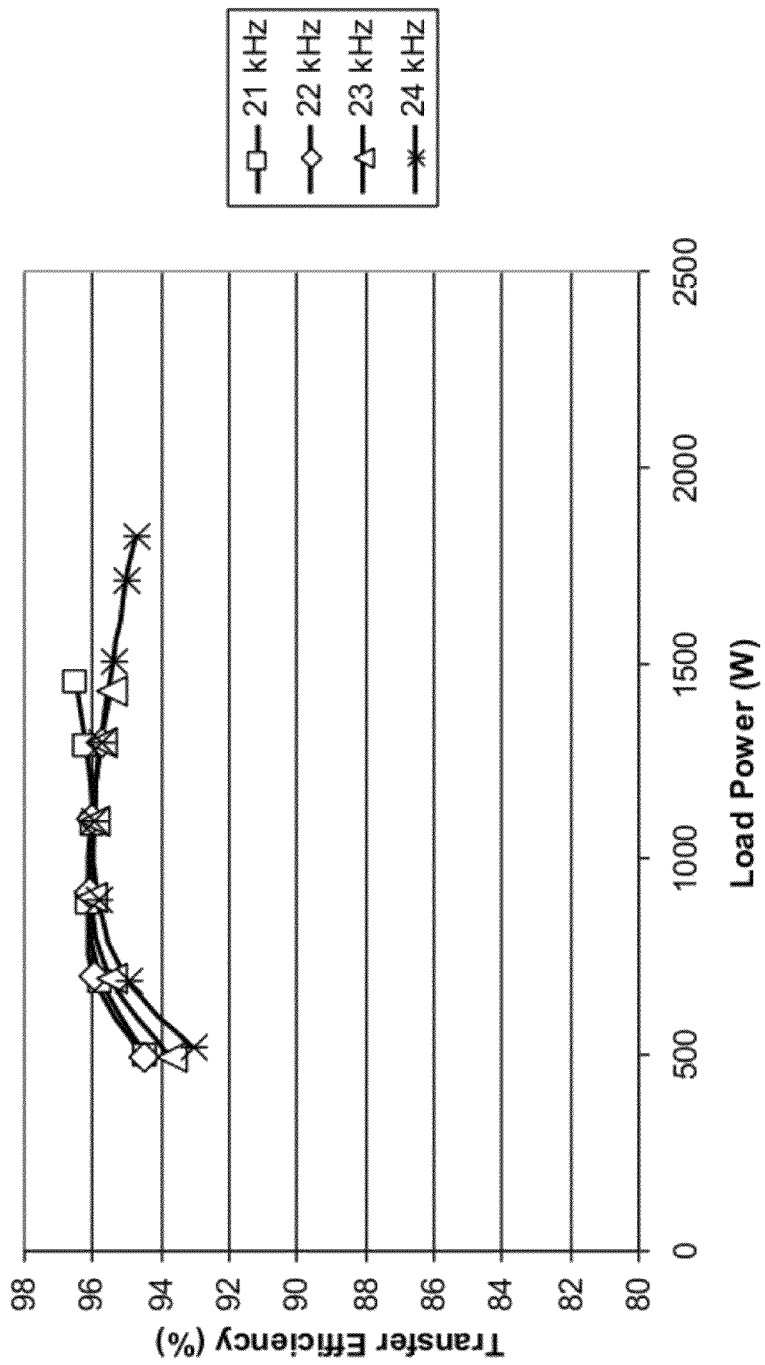
FIG. 8A is a plot of experimental data from an experimental setup that replicates the fifth exemplary air core transformer circuit as a physical implementation at a spacing of 6 inches between the primary coil and the secondary coil.
Figure 8B:
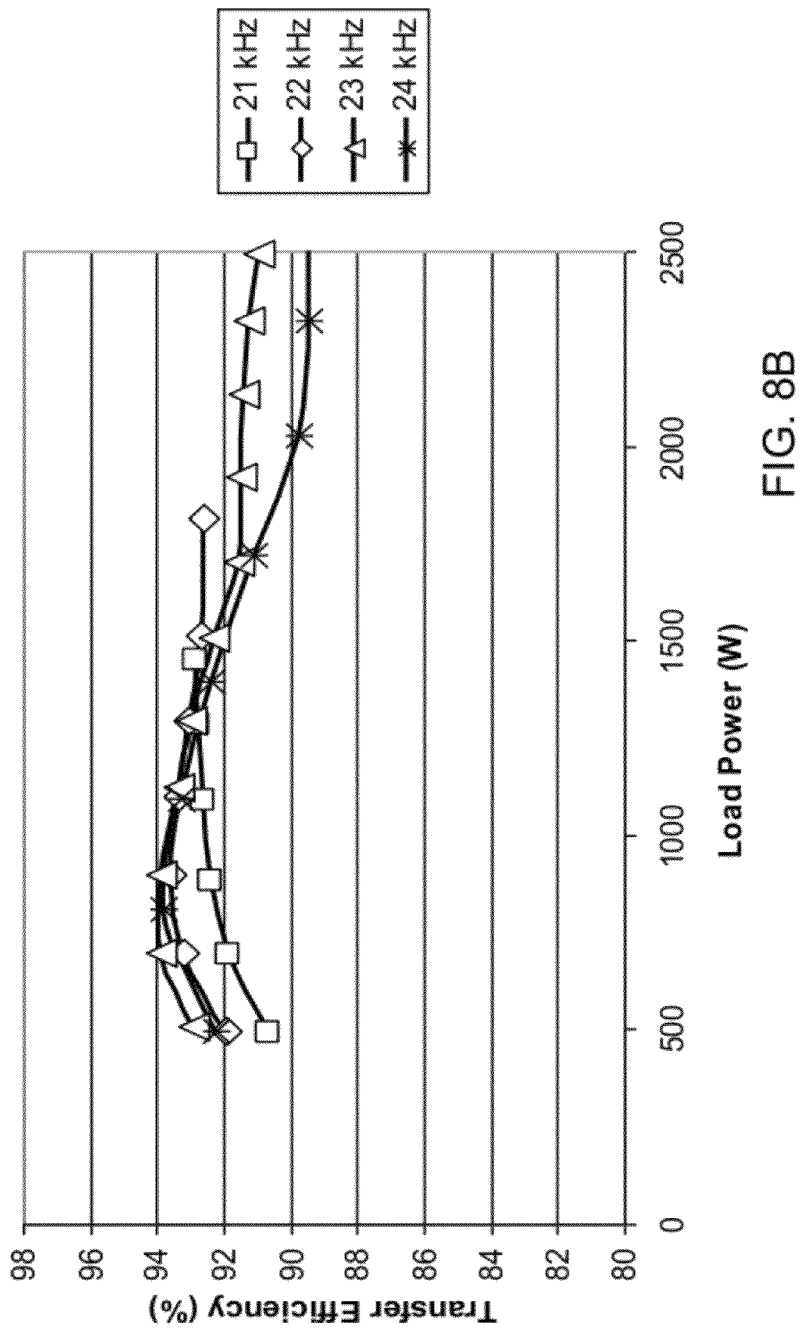
FIG. 8B is a plot of experimental data from the experimental setup at a spacing of 10 inches between the primary coil and the secondary coil.
Figure 8C:
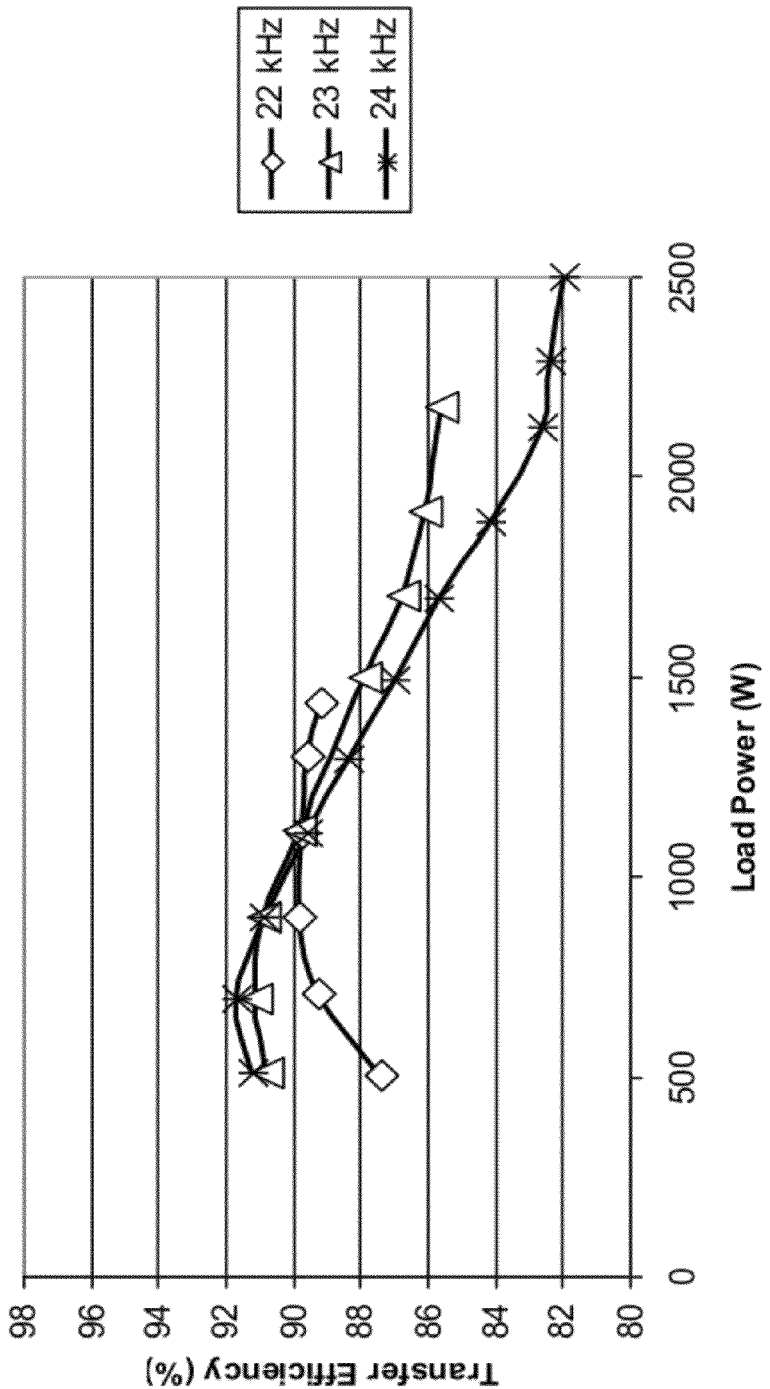
FIG. 8C is a plot of experimental data from the experimental setup at a spacing of 14 inches between the primary coil and the secondary coil.

Referring to FIGS. 8A, 8B, and 8C, results of actual measurements are plotted for an experimental setup that replicates the fifth exemplary air core transformer circuit as a physical implementation. The experimental setup was tested at Oak Ridge National Laboratory. FIGS. 8A, 8B, and 8C correspond to configurations in which the spacing between the secondary coil and the primary coil was 6 inches, 10 inches, and 14 inches, respectively. In general, the transfer efficiency goes down with an increase in the spacing. The measured data deviates from the simulation plots of FIG. 7 due to variations in the coupling constant, among other reasons. The measured value of the coupling constant k in the experimental apparatus was 0.22 at 10" spacing (separation distance between the primary coil and the secondary coil), while the simulations were performed assuming the value of the coupling constant k at 0.3. The measured coupling constant k in the experimental setup varied from k=0.75 at 1.75"

spacing to k=0.15 at 14" spacing with a near exponential falloff with the value of spacing. The coupling constant eventually falls off to 0 with increasing longitudinal and/or lateral separation.

While the curves for 21 and 22 kHz are not complete due to the limitations of instrumentation employed for the DC power supply, the displayed data is sufficient to clearly demonstrate that higher transfer efficiency can be obtained at the higher power levels by significantly reducing the operational frequency of the loosely coupled air core transformer from the resonance frequency. At load power levels below 1 kW, the transfer efficiency is the highest at frequencies close to the resonance frequency, which is the range of operational frequency for prior art transformers. This portion of the data is clearly consistent with teachings in prior art that predict the highest transfer efficiency into a back EMF generating device at or near the resonance frequency of a loosely coupled air core transformer.

As the load power level increases above a certain level, the optimum frequency for higher transfer efficiency significantly deviates from the resonance frequency. Measurements on the physical implementation of the fifth exemplary air core transformer circuit showed that the L-R-C of the antenna system is tuned to 24.27 kHz (which is close to the 25 kHz target resonance frequency of the fifth exemplary air core transformer circuit as simulated for FIG. 7). Even with the inclusion of the inverter circuit, the resonance frequency is not reduced below 23 kHz. However, the operating frequency of 21 kHz and 22 kHz, which are the lowest available operating frequency included in the data, consistently provides higher transfer efficiency above 1,200 W of load power irrespective of the spacing. This portion of the data contradicts teachings in prior art that predict the highest transfer efficiency into a back EMF generating device at or near the resonance frequency of a loosely coupled air core transformer because the transfer efficiency increases more with the deviation, i.e., reduction, from the resonance frequency. However, this portion of the data is consistent with the results of simulation shown in FIG. 7.

FIGS. 8A, 8B, and 8C show that the transfer efficiency is almost independent of the operating frequency around 1,200 Watts within the operating frequency range from 21 kHz to 24 kHz. In general, the transfer efficiency is relatively stable at a certain load power. A "frequency-stable load power" is defined herein as a load power at which the frequency dependence of the transfer efficiency is the least at a given configuration. The frequency-stable load power is about 1,200 W in the measured data.

In a low load power range, which is defined as a range of load power less than the frequency-stable load power, the closer the operating frequency to the resonance frequency (which is 25 kHz in the data from the experimental setup), the greater the transfer efficiency. In a high load power range, which is defined as a range of load power greater than the frequency-stable load power, the farther the operating frequency from the resonance frequency, the greater the transfer efficiency down to a certain fraction of the resonance frequency.

The specific frequencies and load powers in the above example applies to the experimental setup at the Oak Ridge National Laboratory. In general, the value of the frequency-stable load power depends on the specific power transfer system, and can be from 10 W to 100 kW, although systems with lesser and greater frequency-stable load power can also be designed. While other arrangements would have different values as the operating frequency and the load power change, the overall pattern still applies in the same manner, i.e., the presence of a higher transfer efficiency in an operating frequency range that if significantly offset from the resonance frequency.

Thus, in the high load power range, the operating frequency can be reduced to increase the transfer efficiency. This tendency becomes clearer when the overall transfer efficiency is low, for example, as the spacing between the primary coil and the secondary coil increases. The overall trend is that the best efficiency is indeed at the resonance frequency for low load powers, but as the load power increases above a threshold value, the phasing of the two currents in the antennas shift lowers transfer efficiency. By decreasing the operating frequency of the air core transformer, the phase between the antennas can be tuned to enable a more efficient energy transfer.

The data in FIGS. 8A, 8B, and 8C confirm the simulation results for the first curve 710 in FIG. 7, i.e., the operating frequency of a loosely coupled air core transformer increases with decreasing operational frequency when the back EMF load of a back EMF generating device is high enough. In general, the operating frequency of a loosely coupled air core transformer coupled to a back EMF generating device can be from 50% of the resonance frequency of the loosely coupled air core transformer to 95% of the resonance frequency of the loosely coupled air core transformer for high load power applications. In one embodiment, the operating frequency of a loosely coupled air core transformer coupled to a back EMF generating device can be from 60% of the resonance frequency of the loosely coupled air core transformer to 90% of the resonance frequency of the loosely coupled air core transformer for high load power applications. In a further embodiment, the operating frequency of a loosely coupled air core transformer coupled to a back EMF generating device can be from 65% of the resonance frequency of the loosely coupled air core transformer to 85% of the resonance frequency of the loosely coupled air core transformer for high load power applications.

Figure 9:
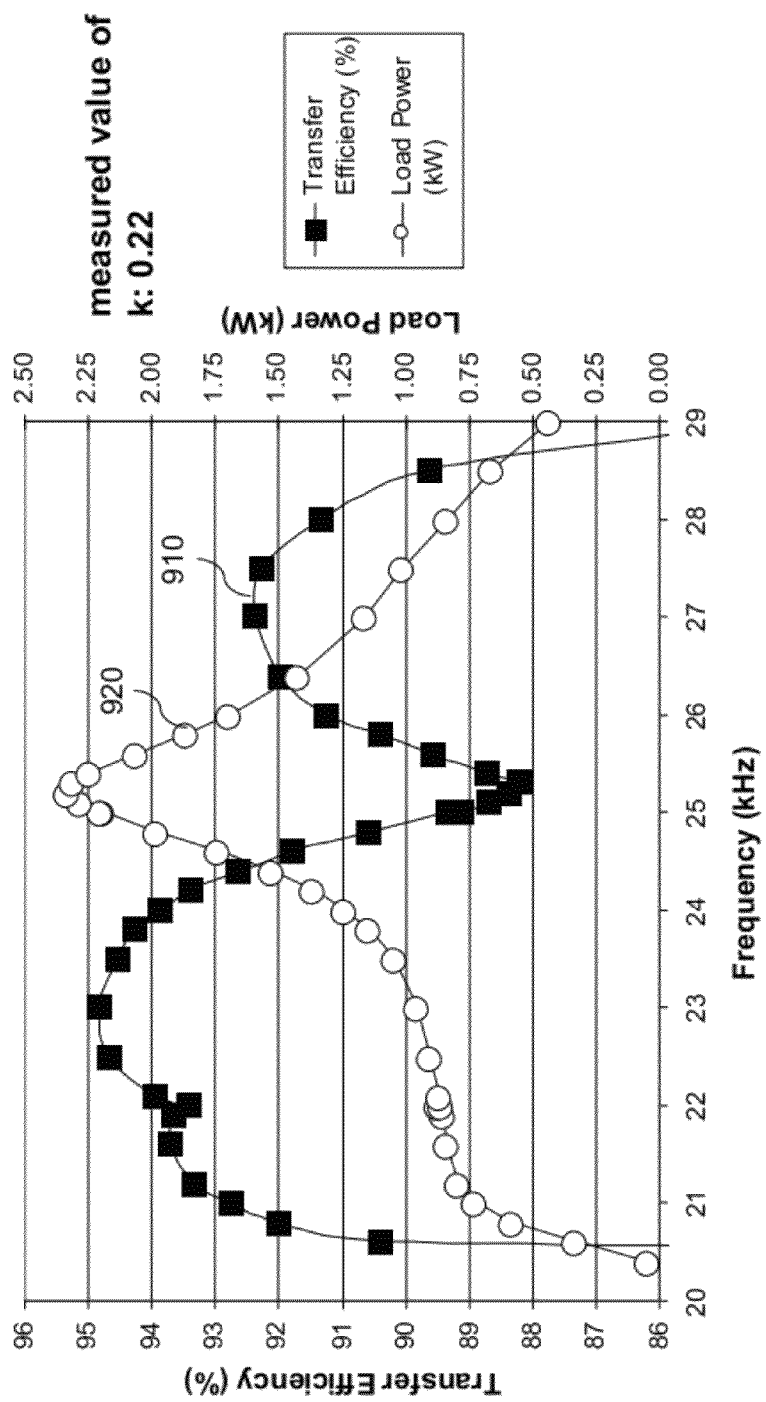
FIG. 9 is a plot for the measured transfer efficiency and the measured load power, which were generated from an exemplary apparatus built at Oak Ridge National Laboratory and configured to operate between 20 kHz and 29 kHz of operating frequency generated through an H-bridge power supply fed by a 38V direct current power source.

Referring to FIG. 9, the measured transfer efficiency and the measured load power are shown, which are from an exemplary apparatus built at Oak Ridge National Laboratory and configured to operate between 20 kHz and 29 kHz of operating frequency generated through an H-bridge power supply fed by a 38V direct current power source. The transfer efficiency curve 910 uses the scale on the left side, and represents the measured transfer efficiency, i.e., the ratio of the power fed into the transmit antenna to the accumulated load power. The load power curve 920 uses the scale on the right side, and represents the total load power delivered to the back EMF generating device, which in this case was a simulated rechargeable battery. The simulated battery consisted of a large capacitor in parallel with a variable resistor. The value of the resistor was constantly adjusted by a digital signal processor to provide a load that regulates the voltage across the capacitor to 120V. For a fixed power supply voltage, the frequency is swept from 20 kHz to 29 kHz to generate the transfer efficiency curve 910 and the load power curve 920. The transfer efficiency curve 910 clearly demonstrates that the best efficiency range occurs well below the resonant frequency of 25 kHz. Thus, energy loss can be minimized by operating at a frequency significantly offset from the resonance frequency. In this particular example, the peak operating efficiency is in the neighborhood of 23 kHz. The load power at 23 kHz is much lower (by about 40%) than the load power obtainable at the resonant frequency, but the level of the load power is still sufficiently high to be usable. In practice one merely needs to increase the supply voltage to up the output power level to the desired value at little cost to the efficiency curve.

The functional dependence of the transfer efficiency on the ratio of the operating frequency to the resonance frequency varies from circuit to circuit. Specifically, the exact transition points, peak values, and placement of peak values are functions of antenna distance, antenna alignment, frequency driven, resonant frequency, power input levels in terms of voltage and current, the back EMF, voltage drops in the IGBT's, etc. In practice, the drop off in the transfer efficiency on the low end of the transfer efficiency curve 910 in FIG. 9 is attributed primarily to a lower value for the coupling constant k, i.e., k=0.22 in the specific setting of 10" spacing, in the experimental setup, which is different from the assumed value of 0.3 in the simulations used to generate FIG. 7. Further, the differences between the transfer efficiency curve 910 in FIG. 9 and the transfer efficiency curve in FIG. 7 additionally attributed to a higher value of the ratio of the back EMF voltage to the supply voltage in the experimental setup, among the other parameters. The differences in the coupling constant k correspond to different separating distance and/or alignment between the antennas, i.e., the primary coil and the secondary coil.

In general, circuit parameters can be selected such that a drop off in the transfer efficiency can occur at an operating frequency that is as low as 50% of the resonance frequency, for example, for applications where the back EMF voltage is much smaller than the supply voltage on the primary circuit as the transfer efficiency curve in FIG. 7 illustrates. The ratio of the operating frequency that provides the highest transfer efficiency to the resonance frequency tends to be low (near 50%) for low power applications, but tends to approach the range between 75% and 90% for high power applications. In other words, the percentage maximum efficiency point in operating frequency tends to increase with the increase in the back EMF voltage.

Thus, higher transfer efficiency can be achieved by utilizing a driving frequency within 50%-95% of the resonance frequency of the two tuned L-R-C tank circuits of a loosely coupled air core transformer when the load power of a back EMF generating load exceeds a certain threshold value. Actual values of transfer efficiency depend on the nature of the back EMF generating load, the coupling constant k (separation between antennas), and actual voltage across the back EMF generating load, which changes with the amount of the transferred power as in the cased of charged batteries that applies more back EMF voltage in proportion to the amount of charge stored therein.

Further, while systems to date use a full wave bridge to rectify the receiving signal, a significantly higher efficiency can be achieved by using only a single diode, which also reduces part count, simplifies the circuit, and saves cost. Drawing power only when the voltage of the receiving side exceeds the back EMF of the back EMF generating load on only one side of the cycle allows the oscillation to recover on the opposite side. Drawing power on both sides, as would be the case with full wave rectification, does not allow the oscillation to recover, which reduces overall efficiency. Utilizing a single diode in the secondary, as opposed to a full wave bridge which is the norm, makes the system respond more like a fly-back transformer which operates with higher efficiency.

In general, an apparatus for inductively transmitting power to a back EMF generating device is provided according to an embodiment of the present disclosure. The apparatus includes a loosely coupled air core transformer including a primary coil in a primary circuit and a secondary coil in a secondary circuit. The primary coil has a first resonance frequency determined by a product of a primary inductance and a primary capacitance in the primary circuit. The apparatus further includes an alternating current (AC) voltage supply that supplies alternating voltage at an operating frequency between 50% and 95% of the first resonance frequency and a back EMF generating device electrically coupled to the secondary coil.

Further, a method of inductively transmitting power to a back EMF generating device is also provided, which can be effected employing the apparatus of the present disclosure. Specifically, the method includes providing a loosely coupled air core transformer including a primary coil in a primary circuit and a secondary coil in a secondary circuit. The primary coil has a first resonance frequency determined by a product of a primary inductance and a primary capacitance in the primary circuit. The method further includes applying alternating voltage at an operating frequency between 50% and 95% of the first resonance frequency to the primary coil. Electrical power is transmitted to a back EMF generating device electrically coupled to the secondary coil through the loosely coupled air core transformer. The AC voltage supply can be configured to provide a single frequency alternating voltage, or can be configured to a variable frequency alternating voltage, which can be set to a specific selected operating frequency.

The back EMF generating device can be a chargeable battery. In one embodiment, the back EMF generating device is physically connected to the secondary circuit as in the second exemplary air core transformer circuit of FIG. 2, the third exemplary air core transformer circuit of FIG. 3, or the fourth exemplary air core transformer circuit of FIG. 5. In this embodiment, the back EMF generating device can be connected to the secondary coil in a parallel connection with a capacitor, i.e., a secondary capacitor having a secondary capacitance Cs. Further, the back EMF generating device can be connected to the secondary coil in a series connection with a diode configured to allow a unidirectional flow of current into the back EMF generating device.

The secondary coil has a second resonance frequency determined by a product of a secondary inductance and a secondary capacitance in the secondary circuit. The secondary inductance can be matched to the primary inductance.

The operating frequency can be selected to be between 60% and 90% of the first resonance frequency. Further, the operating frequency can be selected to be between 65% and 85% of the first resonance frequency.

The alternating current voltage supply includes an H-bridge circuit including four insulated gate bipolar transistors as illustrated in the fourth exemplary air core transformer circuit of FIG. 5 and the fifth exemplary air core transformer circuit of FIG. 6A. The first resonance frequency can from 1 kHz to 1 MHz, and typically from 5 kHz to 100 kHz, although lesser and greater first resonance frequencies can also be employed. The back EMF generating device can have a maximum load power that exceeds 1,200 W, although smaller devices requiring a lesser maximum load can also be constructed for applications requiring less power. An apparatus including a back EMF generating device having a maximum load power exceeding 100 kW can also be constructed. The upper limit to the maximum load power of the back EMF generating device is posed only by material and cost limitations for the back EMF generating device.

The primary circuit and the secondary circuit are located in two separate structures, of which at least one is movable. In one embodiment, a first structure including the primary circuit is stationary, and a second structure including the secondary circuit is movable. The second structure can be placed in proximity to the first structure without causing a physical contact between the primary coil and the secondary coil in order to effect an inductively coupled energy transfer. In another embodiment, a first structure including the primary circuit is movable, and a second structure including the secondary circuit is also movable. The first structure and the second structure can be placed in proximity to each other without causing a physical contact between the primary coil and the secondary coil.

The second structure is a vehicle configured to move on a road, in off-road terrain on land, on water, in water, or in air. Non-limiting examples of the second structure include a car, a truck, a van, a sports utility vehicle, a tractor, an off-road vehicle, an armored military unit, a motorized bicycle or tricycle, a rechargeable power tool, a children's toy vehicle, a boat, a submarine, an airplane, a propellable glider, a gliding suit for areal infiltration, a missile, and a rocket. A particularly useful application of the present disclosure includes an electric vehicle including a rechargeable battery therein.

The primary circuit can be configured to generate alternating voltage at a frequency greater than 1 kHz from available household power supply, which can be an alternating current power supply that operates at a frequency from 50 Hz to 60 Hz and at a voltage from 110 V to 220V. The primary coil and the secondary coil can be positioned such that the spacing between the primary coil and a secondary coil that is in a range from 1 mm to 36 inches. Spacings greater than 36 inches can also be employed, although performance tends to be improved with at a smaller spacing as the data in FIGS. 8A, 8B, and 8C suggests. Because the transfer efficiency does not critically depend on the spacing between the primary coil and the secondary coil, a first structure including the primary coil and a second structure including the secondary coil can be brought into proximity to each other without the need to precisely align the first and second structures, which can be helpful in recharging movable vehicles.

In a practical application for charging a car battery using a loosely coupled air core transformer, the primary coil and the secondary can have the same resonance frequency to allow maximum coupling therebetween. A typical plug-in vehicle today takes about 26 kW-hrs for a full charge. In order to fully charge a plug-in vehicle in 8 hours, a 3.25 kW source is required. A 1 kW source would take 26 hours to charge, which is not practical. A typical 220 V, 30 A outlet in a house would supply about 5 kW to a vehicle. Thus, 5 kW is a good target for home use. Commercial parking lots would want to be able to charge a vehicle in tens of minutes to a couple hours at most. That means 10 kW at the minimum. Thus, a typical charging operation for an electric vehicle would require a high load power greater than 1,200 W, and would benefit by selecting an operational frequency well below the resonance frequency of the loosely coupled air core transformer, i.e., an operating frequency range from 50% to 95% of the resonance frequency.

While the invention has been described in terms of specific embodiments, it is evident in view of the foregoing description that numerous alternatives, modifications and variations will be apparent to those skilled in the art. Other suitable modifications and adaptations of a variety of conditions and parameters normally encountered in image processing, obvious to those skilled in the art, are within the scope of this invention. All publications, patents, and patent applications cited herein are incorporated by reference in their entirety for all purposes to the same extent as if each individual publication, patent, or patent application were specifically and individually indicated to be so incorporated by reference. Accordingly, the invention is intended to encompass all such alternatives, modifications and variations which fall within the scope and spirit of the invention and the following claims.

What is claimed is:

1. An apparatus for inductively transmitting power to a back EMF generating device, said apparatus comprising:
    a loosely coupled air core transformer including a primary coil in a primary circuit and a secondary coil in a secondary circuit, wherein said primary coil has a first resonance frequency determined by a product of a primary inductance and a primary capacitance in said primary circuit;
    an alternating current (AC) voltage supply that supplies alternating voltage at an operating frequency less than said first resonance frequency; and
    the back EMF generating device electrically coupled to said secondary coil.

2. The apparatus of claim 1, wherein said back EMF generating device is a chargeable battery.

3. The apparatus of claim 1, wherein said back EMF generating device is physically connected to said secondary circuit.

4. The apparatus of claim 3, wherein said back EMF generating device is connected to said secondary coil in a parallel connection with a capacitor.

5. The apparatus of claim 4, wherein said back EMF generating device is connected to said secondary coil in a series connection with a diode configured to allow a unidirectional flow of current into said back EMF generating device.

6. The apparatus of claim 1, wherein said secondary coil has a second resonance frequency determined by a product of a secondary inductance and a secondary capacitance in said secondary circuit, wherein said secondary inductance is matched to said primary inductance.

7. The apparatus of claim 1, wherein said operating frequency is between 60% and 90% of said first resonance frequency.

8. The apparatus of claim 7, wherein said operating frequency is between 65% and 85% of said first resonance frequency.

9. The apparatus of claim 1, wherein said alternating current voltage supply comprises an H-bridge circuit including four insulated gate bipolar transistors.

10. The apparatus of claim 1, wherein said first resonance frequency is from 1 kHz to 1 MHz.

11. The apparatus of claim 1, wherein said back EMF generating device has a maximum load power in a range from 10 W to 100 kW.

12. The apparatus of claim 1, wherein said primary circuit and said secondary circuit are located in two separate structures, of which at least one is movable.

13. The apparatus of claim 12, wherein a first structure including said primary circuit is stationary, and a second structure including said secondary circuit is movable.

14. The apparatus of claim 12, wherein a first structure including said primary circuit is movable, and a second structure including said secondary circuit is movable.

15. The apparatus of claim 12, wherein said second structure is a vehicle configured to move on a road, in off-road terrain on land, on water, in water, or in air.

16. The apparatus of claim 1, wherein said primary circuit is configured to generate alternating voltage at a frequency greater than 1 kHz from an alternating current power supply that operates at a frequency from 50 Hz to 60 Hz and at a voltage from 110 V to 220V.

17. The apparatus of claim 1, wherein said loosely coupled air core transformer is designed to operate with a spacing between said primary coil and a secondary coil that is in a range from 1 mm to 36 inches.

18. A method of inductively transmitting power to a back EMF generating device comprising:
providing an apparatus including a loosely coupled air core transformer including a primary coil in a primary circuit and a secondary coil in a secondary circuit, wherein said primary coil has a first resonance frequency determined by a product of a primary inductance and a primary capacitance in said primary circuit; and
applying alternating voltage at an operating frequency less than said first resonance frequency to said primary coil, wherein electrical power is transmitted to a back EMF generating device electrically coupled to said secondary coil through said loosely coupled air core transformer.

19. The method of claim 18, wherein said back EMF generating device is a chargeable battery.

20. The method of claim 18, wherein said back EMF generating device is physically connected to said secondary circuit.

21. The method of claim 20, wherein said back EMF generating device is connected to said secondary coil in a parallel connection with a capacitor.

22. The method of claim 21, wherein said back EMF generating device is connected to said secondary coil in a series connection with a diode configured to allow a unidirectional flow of current into said back EMF generating device.

23. The method of claim 18, wherein said secondary coil has a second resonance frequency determined by a product of a secondary inductance and a secondary capacitance in said secondary circuit, wherein said secondary inductance is matched to said primary inductance.

24. The method of claim 18, wherein said operating frequency is between 60% and 90% of said first resonance frequency.

25. The method of claim 24, wherein said operating frequency is between 65% and 85% of said first resonance frequency.

26. The method of claim 18, wherein said alternating current voltage supply comprises an H-bridge circuit including four insulated gate bipolar transistors.

27. The method of claim 18, wherein said first resonance frequency is from 1 kHz to 1 MHz.

28. The method of claim 18, wherein said back EMF generating device has a maximum load power in a range from 10 W to 100 kW.

29. The method of claim 18, wherein said primary circuit and said secondary circuit are located in two separate structures, of which at least one is movable.

30. The method of claim 29, wherein a first structure including said primary circuit is stationary, and a second structure including said secondary circuit is movable, and said method includes placing said second structure in proximity to said first structure without causing a physical contact between said primary coil and said secondary coil.

31. The method of claim 29, wherein a first structure including said primary circuit is movable, and a second structure including said secondary circuit is movable, and said method includes moving said first structure and said second structure in proximity to each other without causing a physical contact between said primary coil and said secondary coil.

32. The method of claim 29, wherein said second structure is a vehicle configured to move on a road, in off-road terrain on land, on water, in water, or in air.

33. The method of claim 18, further comprising electrically connecting said primary circuit to an alternating current power supply that operates at a frequency from 50 Hz to 60 Hz and at a voltage from 110 V to 220V.

34. The method of claim 18, further comprising positioning said primary coil and said secondary coil such that a spacing between said primary coil and a secondary coil that is in a range from 1 mm to 36 inches.

35. The apparatus of claim 1, wherein said operating frequency is between 50% and 95% of said first resonance frequency.

36. The method of claim 18, wherein said operating frequency is between 50% and 95% of said first resonance frequency.

* * * * *